UNITED STATES PATENT OFFICE.

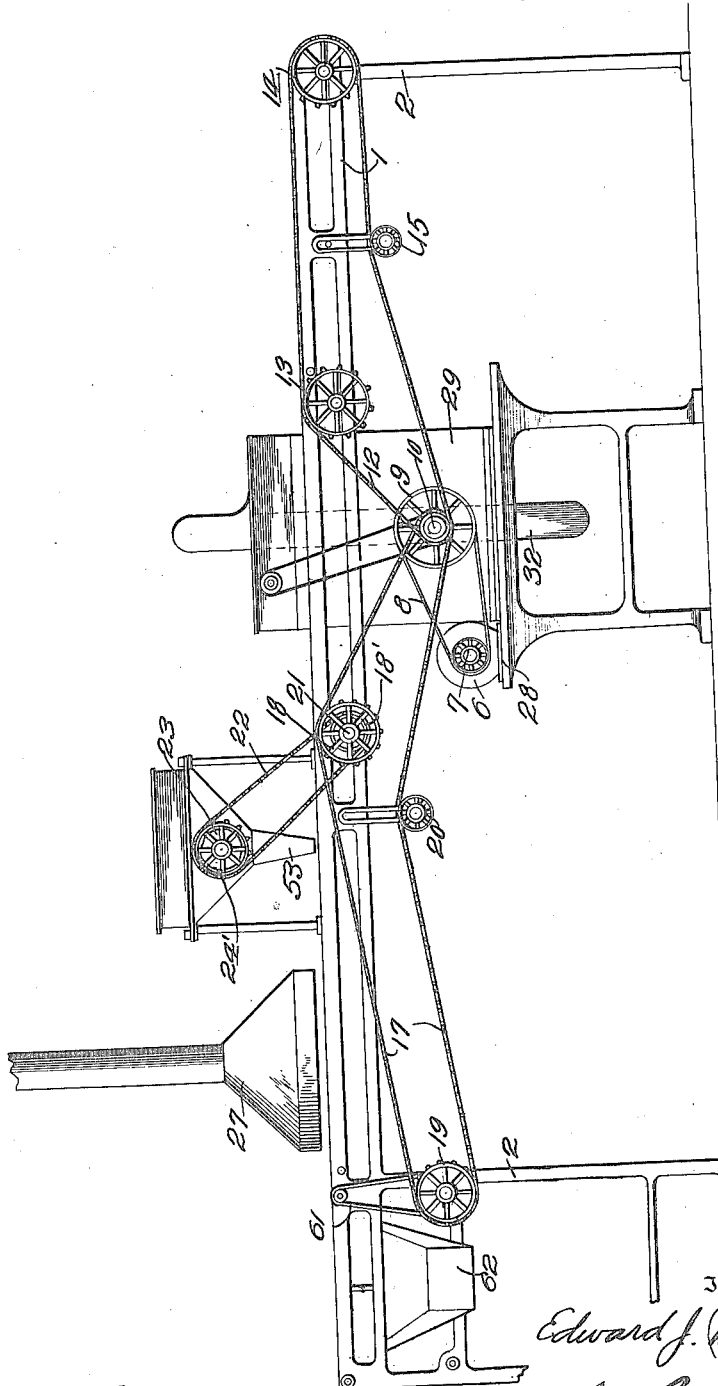

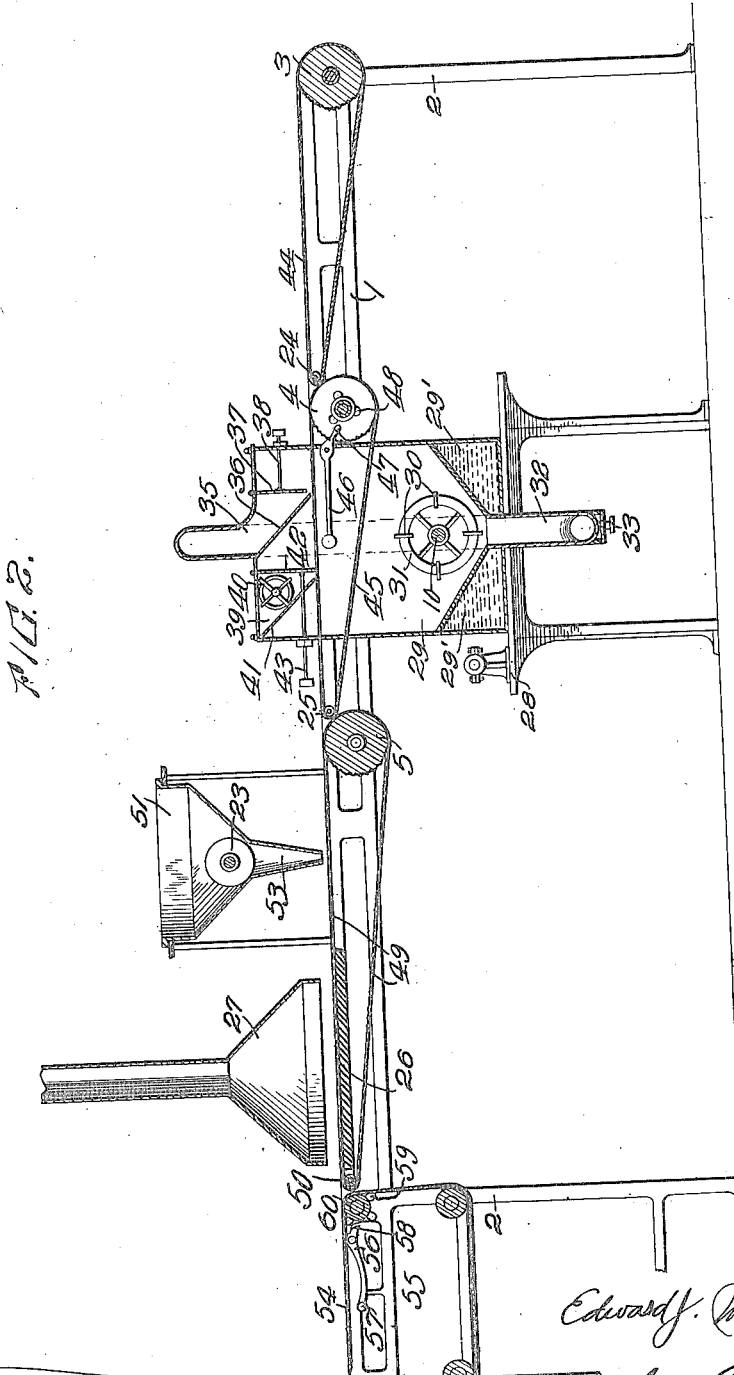

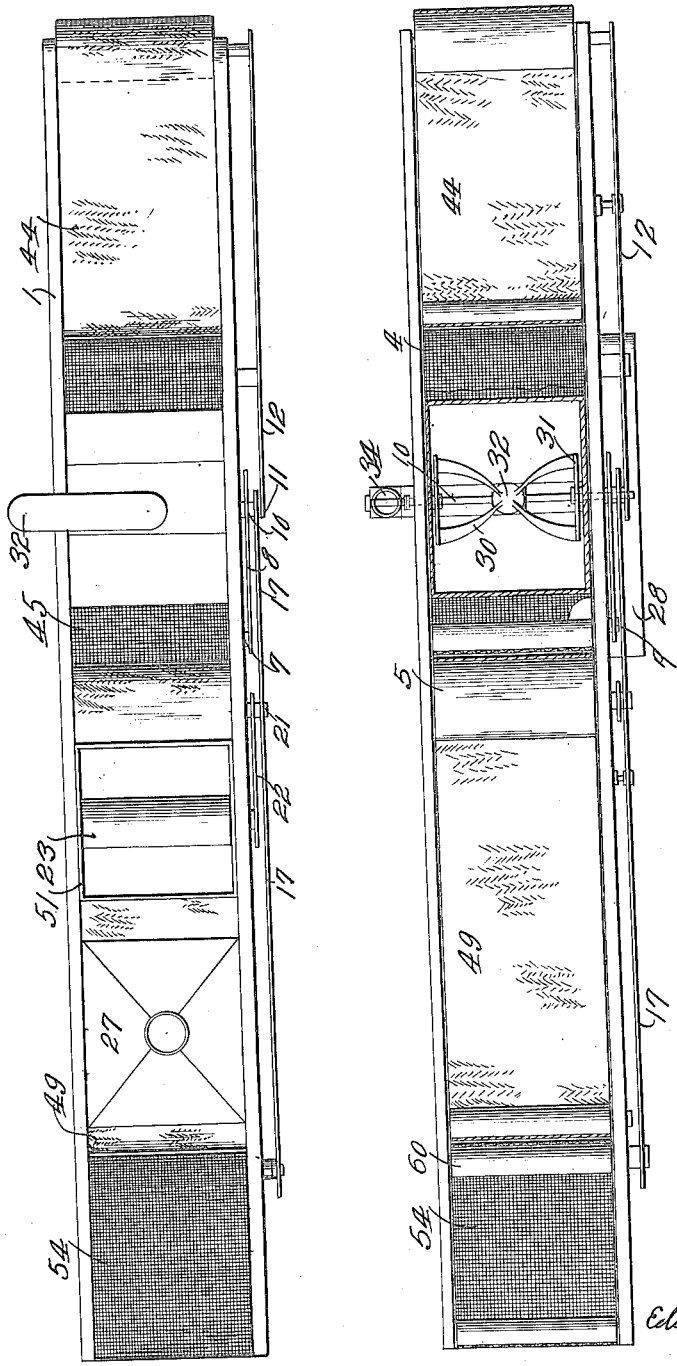

EDWARD J. MOMENEE, OF LIMA, OHIO.

CANDY-COATING MACHINE.

1,166,240.　　　　　Specification of Letters Patent.　　Patented Dec. 28, 1915.

Application filed July 25, 1913. Serial No. 781,230.

*To all whom it may concern:*

Be it known that I, EDWARD J. MOMENEE, a citizen of the United States, residing at Lima, in the county of Allen and State of Ohio, have invented certain new and useful Improvements in Candy-Coating Machines; and I do hereby declare the following to be a full, clear, and exact description of the invention, such as will enable others skilled in the art to which it appertains to make and use the same.

This invention relates to candy coating machines and an object of the invention is to provide a machine having several conveyers of different construction adapted to receive the candy in different states of perfection, so that surplus coating material may be recovered.

A further object is to provide a chamber for melting the candy, and a duct leading out from its bottom through a pump exterior to the housing containing the chamber, and upward to a dropping device at the top of the chamber; whereby the full width of the latter beneath the dropper is serviceable for the passage of the foraminous belt, and whatever surplus material drops through the belt falls back into the melted material and is eventually used.

A further object is to provide controls for the flow of the melted material and the cooling blast of air, both located in the upper portion of the housing and manipulated by handles leading to the exterior.

With these and other objects in view the invention comprises certain novel constructions, combinations, and arrangements of parts as will be described more fully hereinafter.

In the drawings, wherein one embodiment of the invention is shown; Figure 1 is a side elevation of the entire machine. Fig. 2 is a vertical section of the machine shown in Fig. 1. Fig. 3 is a top plan view of the machine shown in Fig. 1. Fig. 4 is a top plan view of the machine with the conveying belt and top of the mixer and the coating applying apparatus removed.

The general aim of this invention is to provide a candy coating machine which shall receive candy to be coated on a canvas belt from which it is transferred to a wire or screen belt, where the candy receives its coating, said wire or screen belt being sufficiently flexible to yield under the blows of a knocker for the purpose of removing surplus coating which may drip through the belt. From the coating apparatus the candy is transferred by means of another canvas belt over a cooled plate which has playing thereupon a draft of cold air. From this cooling plate the candy is led to a coarse wire or screen belt, under which is located another knocker for the purpose of removing nuts or other material which may have been added.

In carrying out the invention I provide a frame 1 preferably of metal supported by means of braces or legs 2 which may be of any suitable construction and so designed to support the ends of the machine. The frame has suitably mounted therein corrugated drums 3, 4 and 5 of a sufficient size to rotate the conveying belts which are trained around them, any suitable means being employed for rotatably mounting these corrugated drums.

In order to afford a convenient and clean method of operating the machine I employ an electric motor indicated at 6, the shaft of which is provided with a sprocket 7 which drives the chain 8 engaging a larger sprocket 9 feathered to a shaft 10. Secured to said shaft 10 is a small sprocket 11 over which is led a chain 12 which passes over sprockets 13 and 14 secured respectively to the corrugated rollers 3 and 4. If desired the idler 15 may be employed for adjusting the chain. Another sprocket 16 is secured to the shaft 10 and has leading therefrom a chain 17 which passes over sprocket 18 secured to the corrugated drum 5, and also passes over the sprocket 19 mounted in one of the end supports of the machine, there being provided an idler 20 similar to the idler 15. A sprocket 18' is mounted upon the shaft 21 of the corrugated roller 5, said sprocket 18' engaging chain 22 for the purpose of driving a feed roller 23 through the intermediary of a sprocket 24'.

Mounted in close proximity to and just in front of the corrugated drum 4 is a drum 24, while a corresponding roller 25 is mounted in a similar position with respect to corrugated drum 5, these rollers 24 and 25 being of very small diameter and being rotatably mounted or rigid with respect to the frame, as the case may be. A cooling plate 26 is provided between corrugated drum 5, and left hand end of the machine, this plate being cooled artificially by any of the well known means, and in order to coöperate with the said plate there is provided an air supplying means 27 which may lead from a refrigerating room or receive air at a reduced temperature in any other manner.

Intermediate the ends of the machine and preferably located between drums 4 and 5 is a platform 28 upon which is mounted the coating apparatus. The lower portion of said apparatus comprises a chamber 29 within which the coating material, such as chocolate, is kept in constant agitation by means of paddles 30 which are carried by wheels 31 fast on the shaft 10 which is suitably journaled in the sides of the casing forming the chamber 29. The sides of the chamber 29 are made to slope so that there is a trough formed just below the paddles, and in order to take the coating material from the chamber to the candy there is provided a duct or pipe 32 leading out from the lower portion of said chamber 29, said duct 32 being provided with a clean out plug 33 if desired. Located beneath the sloping sides of the chamber 29 are tanks 29' adapted to receive water for the purpose of keeping the coating material within said chamber at a uniform temperature, one of these tanks if desired connecting with a cold water supply (not shown), while the other is connected with a hot water supply (not shown), so that it will be possible to regulate the temperature of the coating material quickly, or these tanks might both be provided with taps leading to hot and cold water sources. The duct passes through the platform 28, curves out one side, ascends alongside the housing, and then curves inward over and passes through the top of the same. I find this form of duct superior to the candy elevators now in general use and which raise the melted candy within the housing, because the duct by passing upward outside the housing leaves the interior of the latter entirely uninterrupted and available for the passage of the foraminous belt, besides which the pump is outside the housing and may be more readily oiled, controlled, and repaired when necessary. A pump 34 is located at a convenient position within the duct 32 and may be driven in any suitable manner, the method shown in the drawings being to extend the shaft 10 upon which the paddles are mounted and drive said pump by the shaft.

From the pump the coating material is sent to the top of the coating apparatus and into a compartment 35 which has its lower portion provided with a baffle plate 36 which directs the coating material against a hinged gate 37. This gate has a pivotally mounted rod 38 provided with means for locating the gate in any predetermined position, after the opening between said plate and baffle plate has been determined. Forming another part of the coating apparatus is a second upper compartment 39 within which is mounted a fan 40 which forces the air against a baffle plate 41 and an adjustable door 42, this door 42 having an adjusting rod 43 similar to the adjusting rod 38, and being provided with means for locking the same in any desired position, such as stops or nuts adjustable on the rods as indicated. The outer ends of these rods preferably have handles as shown, and I consider it desirable that the handles be entirely on the exterior of the housing and within ready reach of the attendant operator whereby adjustments may be effected without reaching into the chamber, or even opening the housing which would to a degree cool the contents.

When it is desired to coat candy such as chocolate creams, the fondant will be placed upon a canvas belt 44 driven by the corrugated roller 3 over the small roller 24. Separate drops of fondant will pass from the canvas belt 44 to a wire or screen belt 45 which is located just beneath the gate 37 used for delivering the thickness of coating to be applied to the fondant. This belt is made of screen or other foraminous material so that the surplus coating, which in this particular instance is cited as chocolate, may pass through the belt to the chamber 29 beneath and become mixed with the other chocolate contained in said chamber. In order that the dropping of the surplus chocolate may be assisted there is mounted in one corner of the chamber 29 a knocker 46 which has a cam 47 extending therefrom, which engages the cam trips 48 carried by the shaft of the drum 4. The other end of said knocker is provided with any suitable weight so disposed as to strike the belt every time the cam is tripped by one of the trips 48. After passing beyond the coating regulating gate 37 and knocker 46, the candy is subjected to a draft of air caused by the fan 40, said draft being for the purpose of cooling the candy somewhat, and also for the purpose of blowing from the screen and candy such surplus material as may not have been removed by the knocker. This fan may also be provided for the purpose of thinning the coating material upon the candy, if in the judgment of the operator the same is too thick. This fan 40 is preferably driven by some means under the control of the operator, so that the strength of the draft may be varied to suit conditions. The screen belt 45 discharges coated candy upon another canvas belt 49 which is driven by the corrugated drum 5 and is led over a small roller 50 similar to the rollers 24 and 25. This canvas belt 49 is designed to move across cooling plate 26 and to lie just under cold air discharging device 27. If it be desired to make simply coated creams without providing auxiliary coatings or nuts or other confections the machine may discharge the candy from the belt at the small roller 50 to any suitable device known in the art, but not shown in the drawings.

If it should be desired to provide the chocolate coated fondant with an additional coating of nuts there may be provided a feeder 51 which is provided with a feeding roller 23 actuated as shown, said feeder being provided with a funnel 53 which discharges nuts to the candy carried by the canvas belt 49. In the event of using a nut coating pan, such as indicated at 51, it will also be desirable to provide at the end of the frame a coarse screen 54 which receives the nut coated candy from the belt 49 and serves to pass all surplus nuts not stuck to the candy to a chamber 55 located beneath said coarse belt, there being provided beneath the coarse belt a knocker 56, one end of which is provided with a weight 57 adapted to strike the coarse belt, while the other end is provided with a cam 58 adapted to engage the trips on a wheel 59 carried by a shaft 60 deriving its power from sprocket 19 by means of a belt 61. As the candy passes over the cooling belt the coating material should be made sufficiently stiff to resist the action of the roller 50 adjacent the coarse screen belt 54, but the nuts will pass through the screen and may be discharged by means of a suitable chute 62 in the nut conveyer (not shown) for the purpose of returning said nuts to the feeder 51.

While belts of particular construction have been shown herein, yet I realize that certain variations in these belts may be made and still accomplish the same result as that accomplished in the machine as described, and I also describe the candy as passing from one belt to another, but it is to be understood that any of the means used in the candy making art for assisting the passage of the candy from one conveyer to another and also for preserving the shape of the same may be used, such as coating paper.

What I claim is:—

1. In a candy coating machine, the combination with a horizontally disposed foraminous belt, means for feeding fondant to the inlet end of this belt and taking the candy from the outlet end thereof, and a platform beneath said belt; of a housing supported by said platform and through which the belt moves horizontally, the housing having a chamber beneath the belt and two compartments above it, an agitator within said chamber, a duct leading from a low point in said chamber down, then curving outward and leading upward alongside the housing, then curving over and leading again into the housing and communicating with one of said compartments, a baffle in the latter directed obliquely toward said belt, a hinged gate coacting with the delivery edge of said baffle, means for setting this gate, and a pump within said duct.

2. In a candy coating machine, the combination with an upright housing having a chamber at its lower portion and two compartments at its upper portion, a foraminous belt moving horizontally through said housing, and a knocker within the latter beneath said belt; of a duct leading from said chamber down, then curving outward and leading upward alongside the housing, then curving over and leading again into the housing and communicating with one of said compartments, a pump in this duct, a baffle under its delivery end within said compartment, means for regulating the flow of material from the baffle onto the fondant on said belt, a fan within the other compartment, a baffle directing its blast of air forward and downward onto the material upon the belt, and means for regulating the blast of air.

3. In a candy coating machine, the combination with a conveyer for the fondant drops, means for coating the same with candy, means for feeding nut particles to the coated drops, and means for next cooling the drops, of a screen belt upon which the product is delivered, means for applying knocks to said belt to dislodge surplus nut particles, and a chute beneath the belt for collecting such particles.

In testimony whereof I affix my signature in presence of two witnesses.

EDWARD J. MOMENEE.

Witnesses:
  E. G. DEMPSTER,
  ANNA S. KINZER.